(12) United States Patent
Mabu

(10) Patent No.: US 10,821,637 B2
(45) Date of Patent: Nov. 3, 2020

(54) RESIN INJECTION APPARATUS AND METHOD OF MANUFACTURING CORE PRODUCT

(71) Applicant: Mitsui High-tec, Inc., Kitakyushu (JP)

(72) Inventor: Hirotoshi Mabu, Kitakyushu (JP)

( * ) Notice: Subject to any disclaimer, the term of this patent is extended or adjusted under 35 U.S.C. 154(b) by 267 days.

(21) Appl. No.: 15/795,263

(22) Filed: Oct. 27, 2017

(65) Prior Publication Data
US 2018/0117806 A1    May 3, 2018

(30) Foreign Application Priority Data

Oct. 31, 2016   (JP) .................................. 2016-212555
Sep. 5, 2017    (JP) .................................. 2017-170628

(51) Int. Cl.
| | |
|---|---|
| *B29C 45/02* | (2006.01) |
| *B29C 45/27* | (2006.01) |
| *B29C 45/14* | (2006.01) |
| *H02K 15/03* | (2006.01) |
| *H02K 15/12* | (2006.01) |
| *B29C 45/26* | (2006.01) |
| *B29C 45/53* | (2006.01) |
| *B29L 31/00* | (2006.01) |
| *B29K 105/20* | (2006.01) |

(52) U.S. Cl.
CPC ........ *B29C 45/02* (2013.01); *B29C 45/14778* (2013.01); *B29C 45/26* (2013.01); *B29C 45/27* (2013.01); *B29C 45/535* (2013.01); *H02K 15/03* (2013.01); *H02K 15/12* (2013.01); *B29C 45/14639* (2013.01); *B29K 2105/203* (2013.01); *B29K 2995/0012* (2013.01); *B29L 2031/749* (2013.01); *B29L 2031/7498* (2013.01)

(58) Field of Classification Search
CPC ... B29C 45/02; B29C 45/26; B29C 45/14639; B29K 2105/203; H02K 15/03
See application file for complete search history.

(56) References Cited

U.S. PATENT DOCUMENTS

| | | | | |
|---|---|---|---|---|
| 2012/0324719 A1* | 12/2012 | Sasaki | ..................... | B29C 39/10 29/598 |
| 2014/0124978 A1* | 5/2014 | Mabu | ..................... | H02K 15/03 264/261 |
| 2014/0196276 A1* | 7/2014 | Nagai | ..................... | H02K 15/03 29/598 |

FOREIGN PATENT DOCUMENTS

| | | |
|---|---|---|
| EP | 1844536 | 3/2013 |
| JP | 2009-107139 | 5/2009 |
| JP | 2009107139 | * 10/2009 |
| JP | 2014-093862 | 5/2014 |

(Continued)

*Primary Examiner* — Jacob T Minskey
*Assistant Examiner* — Debjani Roy
(74) *Attorney, Agent, or Firm* — Soei Patent & Law Firm

(57) ABSTRACT

A resin injection apparatus includes: a mold die and a receiving die configured to hold a core body in an axial direction of the core body, the core body having a resin formation region serving as a region where resin is to be formed by injection of molten resin; a plurality of plungers; and a pot group attached to the mold die, the pot group including a plurality of pots proximately located next to each other in a direction. Each of the plurality of pots has a through hole in which a corresponding plunger of the plungers is insertable. The plurality of pots have a first coefficient of thermal expansion that is lower than a second coefficient of thermal expansion of the mold die.

20 Claims, 9 Drawing Sheets

(56) References Cited

FOREIGN PATENT DOCUMENTS

JP    2015-039296    2/2015

\* cited by examiner

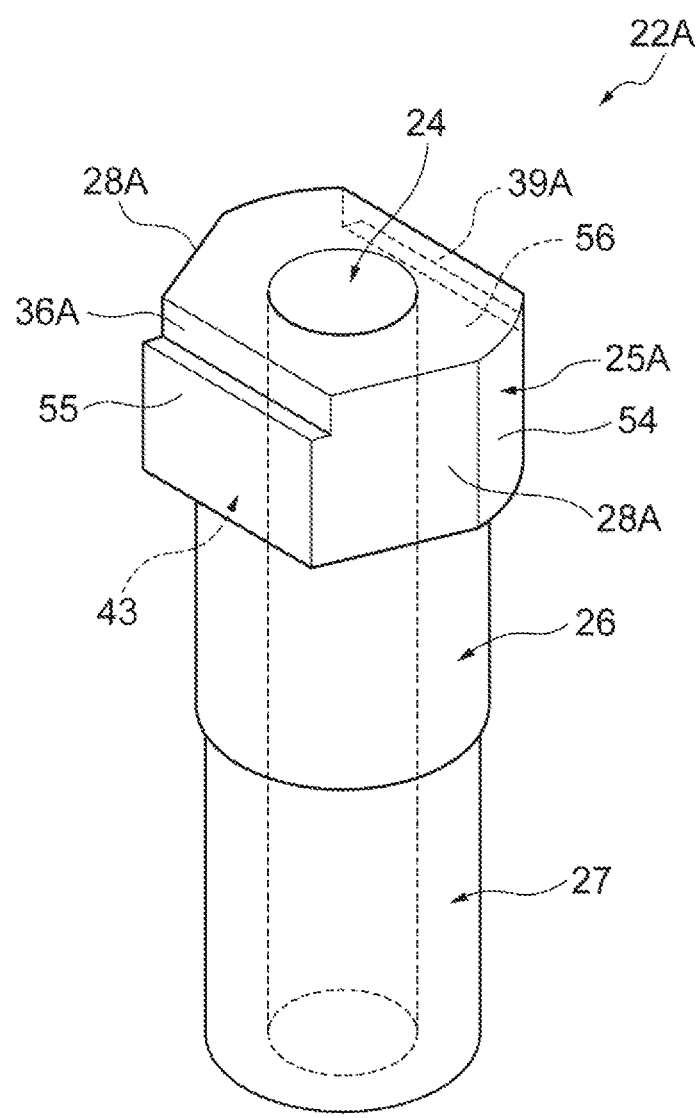

RESIN INJECTION APPARATUS AND METHOD OF MANUFACTURING CORE PRODUCT

CROSS-REFERENCE TO RELATED APPLICATIONS

This application is based upon and claims the benefit of priority from Japanese Patent Application No. 2016-212555, filed on Oct. 31, 2016, and from Japanese Patent Application No. 2017-170628, filed on Sep. 5, 2017, the entire contents of which are incorporated herein by reference.

BACKGROUND

1. Field

The present disclosure relates to a resin injection apparatus and a method of manufacturing a core product.

2. Disclosure of the Related Art

Japanese Unexamined Patent Publication No. 2015-039296 discloses a resin filling apparatus including a pair of dies (an upper die and a lower die), a gate plate, and a plurality of plungers. The lower die is configured such that a stacked core body having a plurality of magnet insertion holes can be placed thereon. The lower die has a plurality of through holes extending in the top-bottom direction. One pot having a cylindrical shape is attached in each through hole. The upper die holds the stacked core body in the top-bottom direction together with the lower die. The gate plate is disposed between the lower die and the stacked core body. The gate plate has a plurality of gate holes provided at positions corresponding to the magnet insertion holes of the stacked core body and a plurality of resin flow paths (also referred to as runners) that communicatively connects the gate holes to the outlets of the pots. Each plunger can advance or recede in the corresponding pot.

A stacked rotor core is produced by filling the magnet insertion holes in the stacked core body with resin in a molten state (molten resin) using the resin filling apparatus described in Japanese Unexamined Patent Publication No. 2015-039296. Specifically, the method of manufacturing the stacked rotor core includes: holding the stacked core body with magnets inserted in the magnet insertion holes between the upper die and the lower die (mold die) having the plate placed thereon; pushing out the molten resin from the pots with the plungers and injecting the molten resin into the magnet insertion holes through the resin flow paths and the gate holes of the plate. With this method, the permanent magnets in the magnet insertion holes are sealed with resin, and a stacked rotor core is obtained.

In the resin filling apparatus described in Japanese Unexamined Patent Publication No. 2015-039296, since the pot is separate from the lower die, the pot alone can be replaced without replacing the entire lower die when wear or damage of the pot (hereinafter referred to as "wear or the like") is caused by repeatedly inserting and removing the plunger into/from the pot. Thus, the ease of maintenance of the resin filling apparatus can be improved.

SUMMARY

A resin injection apparatus according to an aspect of the present disclosure includes: a mold die and a receiving die configured to hold a core body in an axial direction of the core body, the core body having a resin formation region serving as a region where resin is to be formed by injection of molten resin; a plurality of plungers; and a pot group attached to the mold die, the pot group including a plurality of pots proximately located next to each other in a direction. Each of the plurality of pots has a through hole in which a corresponding plunger of the plungers is insertable. The plurality of pots have a first coefficient of thermal expansion that is lower than a second coefficient of thermal expansion of the mold die.

A method of manufacturing a core product according to another aspect of the present disclosure includes: holding a core body with a mold die and a receiving die in an axial direction of the core body, the core body having a resin formation region that house injected molten resin; pushing out the molten resin in each of a plurality of pots attached to the mold die toward the core body with a plunger, while the core body is held by the mold die, wherein the plurality of pots are arranged adjacent to each other in a direction of alignment to form a pot group, and wherein the plurality of pots have a first coefficient of thermal expansion lower than a second coefficient of thermal expansion of the mole die; and curing the molten resin pushed out by the plunger and injected into the resin formation region.

The detailed description given herein below and the accompanying drawings are given by way of illustration only.

BRIEF DESCRIPTION OF THE DRAWINGS

FIG. 7 is a perspective view of the pot shown in FIG. 5.

DETAILED DESCRIPTION

Figure 1:
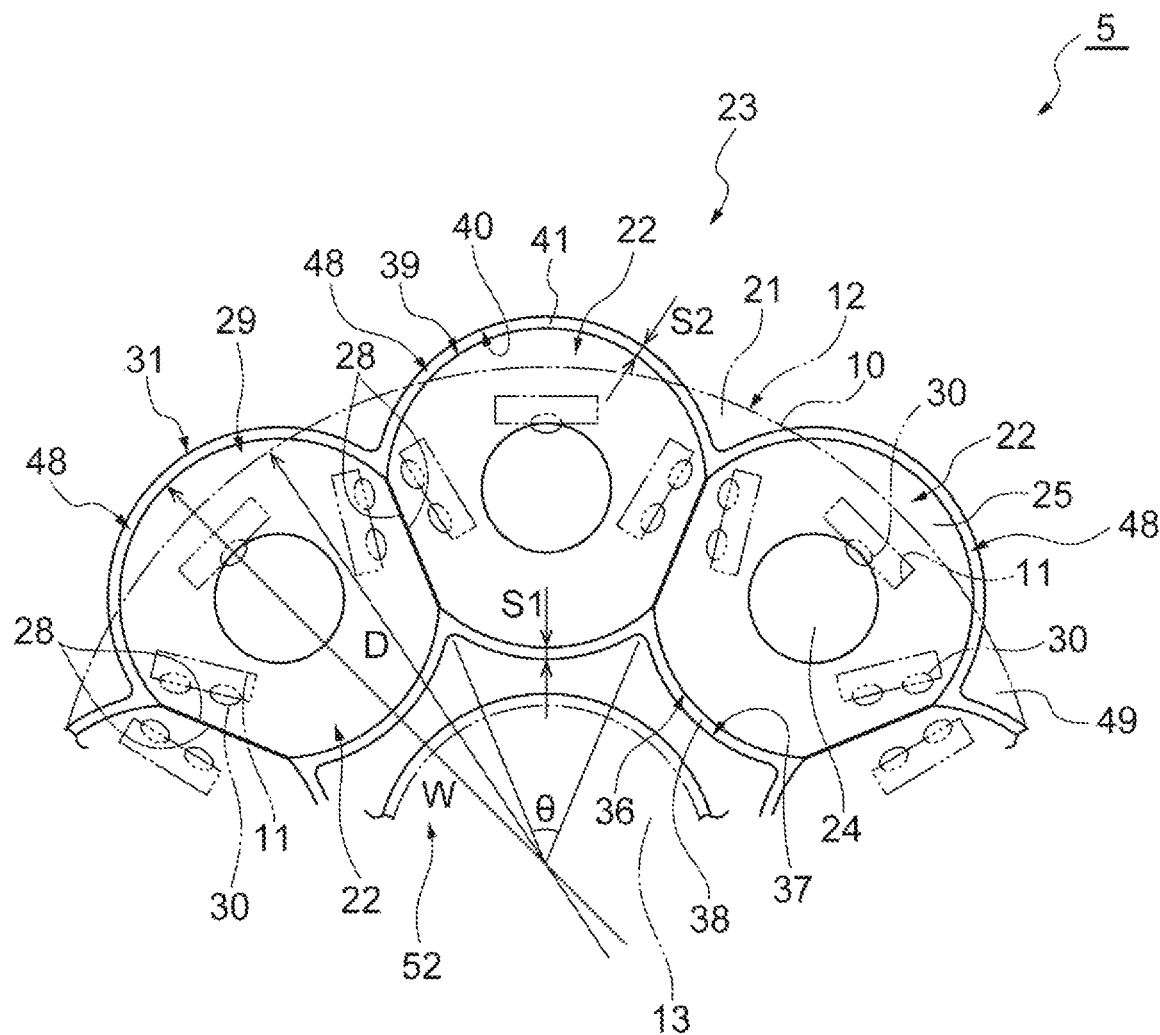
FIG. 1 is a plan view of the overall configuration of a resin injection apparatus according to a first embodiment as viewed from below.

Exemplary embodiments described in the following according to the present disclosure are examples for explaining the present invention, and thus the invention should not be limited to the following details.

Overview of Embodiments

Example 1

A resin injection apparatus according to a first example includes: a mold die and a receiving die configured to hold a core body in an axial direction of the core body, the core body having a resin formation region serving as a region where resin is to be formed by injection of molten resin; a plurality of plungers; and a pot group attached to the mold die, the pot group including a plurality of pots proximately located next to each other in a direction. Each of the plurality of pots has a through hole in which a corresponding plunger of the plungers is insertable. The plurality of pots have a first coefficient of thermal expansion that is lower than a second coefficient of thermal expansion of the mold die.

Since the coefficient of thermal expansion of a pot is lower than the coefficient of thermal expansion of the mold die, a gap is produced between the pot and the mold die when the pot and the mold die are thermally expanded by heating during resin injection. On the other hand, even when the pot and the mold die are thermally expanded, the pots arranged adjacent to each other in the predetermined direction are kept close to each other. Thus, one pot is less likely to be tilted by heating during resin injection, because a change in posture is restricted by the presence of another pot adjacent thereto in the predetermined direction. Accordingly, the tilting of the pot relative to the mold die can be suppressed. In addition, as a result of suppressing the tilting of the pot relative to the mold die, the posture of the pot relative to the mold die is easily maintained even when the pot is pushed by the molten resin intruding into the gap between the pot and the mold die. Accordingly, the structure in which the resin flow path extends to span the adjacent pots or the structure in which the resin flow path extends to span the pot and the mold die can be employed, so that the flexibility in design of the resin flow path or the gate hole can be enhanced.

Example 2

In the resin injection apparatus according to the first example above, the plurality of pots may be arranged adjacent to each other in an annular direction of alignment.

Example 3

In the resin injection apparatus according to the second example above, the maximum outer diameter of the pot group corresponding to a surface of the plurality of pots opposed to the core body may be larger than a maximum outer diameter of the core body. In this case, compared with a core body configuration in which the maximum outer diameter of the pot group is smaller than the maximum outer diameter of the core body, the region where the core body faces the pot group is larger. Thus, the gate hole is easily disposed in this region.

Example 4

In the resin injection apparatus according to any one of the first to third examples above, the opposed surfaces of the pots arranged adjacent to each other in the predetermined direction may be planar. In this case, since the opposed surfaces are planar, the opposed surfaces are more easily located close to each other so as to be directly opposed to each other. Thus, the adjacent pots can be positioned easily.

Example 5

In the resin injection apparatus according to any one of the first to fourth examples above, the proximately located pots may be directly opposed to each other at a front end portion of the plurality of pots opposite to the core body; the mold die may have an accommodating depression capable of accommodating the pot group; and an outer circumferential surface of the front end portion attached to the accommodating depression may be spaced apart from an inner circumferential surface of the accommodating depression. In this case, even if molten resin leaks out of the resin flow path extending to span the pot and the mold die, the molten resin enters a space actively formed between the outer circumferential surface of the front end portion of the pot and the inner circumferential surface of the accommodating depression. Thus, the leaking molten resin accumulates in this space. Accordingly, leakage of the molten resin to the outside of the resin injection apparatus can be suppressed.

Example 6

In the resin injection apparatus according to the fifth example above, a fixed portion of the pot that is located between the front end portion and the base end portion may be fitted in the accommodating depression whereby the pot is attached to the accommodating depression. In this case, when molten resin intrudes into the space between the outer circumferential surface of the front end portion of the pot and the inner circumferential surface of the accommodating depression, the fixed portion fitted in the accommodating depression prevents further intrusion of the molten resin into the accommodating depression. Thus, the tilting of the pot pushed by the molten resin intruding into the depth of the accommodating depression is suppressed. Accordingly, wear or the like of the pot or the plunger can be suppressed during insertion/removal of the plunger into/from the pot.

Example 7

In the resin injection apparatus according to the sixth example above, the outer circumferential surface of the base end portion of the pot attached to the accommodating depression may be spaced apart from the inner circumferential surface of the accommodating depression. In this case, when the pot is attached to the accommodating depression, the base end portion of the pot is easily inserted into the accommodating depression. Thus, the operation of attaching the pot to the mold die is facilitated, thereby improving the ease of maintenance.

Example 8

The resin injection apparatus according to any one of the first to seventh examples above may further include a cull plate configured to be disposed between the core body and the mold die; and the cull plate may have a gate hole disposed in a contact surface in which the pot group and the cull plate are in contact with each other and a runner serving as a resin flow path configured to communicatively connect a discharge port configured to discharge the molten resin from the pot to the gate hole. In this case, since the gate hole is disposed in the contact surface between the pot group and the cull plate, the pot and the gate hole are communicatively connected with each other in the contact surface. Thus, when the molten resin flows from the pot to the gate hole, it can be suppressed that the molten resin flows across the gap between the pot and the mold die.

Example 9

In the resin injection apparatus according to any one of the first to eighth examples above, the pot may be formed of cemented carbide. In this case, even when the pot and the plunger come into contact with each other during insertion/ removal of the plunger into/from the pot, the wear or the like of the pot can be reduced.

Example 10

The resin injection apparatus according to any one of the first to ninth examples above may further include at least one holding member attached to the mold die and configured to form a concave space with the mold die; the at least one holding member may be configured to hold a portion of the pot in the concave space; and the at least one holding member may have a coefficient of thermal expansion that is higher than the first coefficient of thermal expansion of the pot. In this case, the mold die and the holding member expand more easily due to thermal expansion than the pot. Thus, supposing that a protrusion of the mold die or the holding member is inserted in a depression formed in the pot, the protrusion expands in the depression to exert stress on the pot, or the protrusion may be disengaged from the depression due to the expansion of the mold die. In the resin injection apparatus according to the tenth example, however, a portion of the pot is located in the concave space and therefore a gap is likely to be produced between the pot and the mold die in this concave space. Thus, stress is less likely to act on the pot from the mold die, and the load on the pot can be reduced.

Example 11

In the resin injection apparatus according to the tenth example above, the portion of the pot may be a flange portion configured to protrude from the outer circumferential surface of the pot in a direction intersecting a lengthwise direction of the pot; and an interior shape of the concave space may correspond to an outer shape of the flange portion. In this case, it is possible to easily implement a configuration in which the portion of the pot is held by the holding member and the mold die in a state in which the portion of the pot is located in the concave space formed with the holding member and the mold die.

Example 12

In the resin injection apparatus according to the tenth example or the eleventh example above, at least one holding member may include a plurality of holding members; and the pot may be held by a pair of the holding members and the mold die. In this case, a portion of the pot is stably held by a pair of the holding members and the mold die, so that displacement of the pot from the mold die can be sufficiently suppressed while the load on the pot is reduced.

Example 13

In the resin injection apparatus according to any one of the tenth to twelfth examples above, the mold die may have a positioning portion configured to suppress rotation of the pot relative to the mold die. In this case, the pots are disposed along the positioning portion. Thus, the orientation of each pot is uniquely determined in accordance with the positioning portion. Accordingly, when the pots are disposed, the interference between the adjacent pots is suppressed. As a result, the operation of attaching the pots can be easily performed.

Example 14

In the resin injection apparatus according to any one of the tenth to thirteenth examples above, in a state in which the mold die is heated to discharge the molten resin from the pot, an opposed surface to the core body of the pot may be flush with an opposed surface to the core body of the mold die or may be located closer to the receiving die than the mold die. In this case, even in a state in which the pot and the mold die are expanded by heating, the structure suppressing such a state that the molten resin flows across the gap can be maintained when the molten resin flows from the pot to the gate hole.

Example 15

A method of manufacturing a core product according to another example includes: holding a core body with a mold die and a receiving die in an axial direction of the core body, the core body having a resin formation region that house injected molten resin; pushing out the molten resin in each of a plurality of pots attached to the mold die toward the core body with a plunger, while the core body is held by the mold die, wherein the plurality of pots are arranged adjacent to each other in a direction of alignment to form a pot group, and wherein the plurality of pots have a first coefficient of thermal expansion lower than a second coefficient of thermal expansion of the mold die; and curing the molten resin pushed out by the plunger and injected into the resin formation region. The method of manufacturing a core product achieves the same operational effect as in the resin injection apparatus according to the first example above.

Example 16

In the method according to the fifteenth example above, the plurality of pots may be annularly aligned with each other in the direction of alignment. In this case, the same operational effect as in the resin injection apparatus according to the second example above can be achieved.

Example 17

In the method according to the sixteenth example above, a diameter of the pot group corresponding to an outer surface of the plurality of pots opposed to the core body may be larger than a maximum outer diameter of the core body. In this case, the same operational effect as in the resin injection apparatus according to the third example above can be achieved.

Example 18

In the method according to any one of the fifteenth to the seventeenth examples above, the proximately located pots may be directly opposed to each other at a front end portion of the plurality of pots opposite to the core body; the mold die may have an accommodating depression configured to accommodate the pot group; and an outer circumferential surface of the front end portion attached to the accommodating depression may be spaced apart from an inner circumferential surface of the accommodating depression. In this case, the same operational effect as in the resin injection apparatus according to the fifth example above can be achieved.

Example 19

The method according to any one of the fifteenth to eighteenth examples above may further include disposing a cull plate between the core body and the mold die before holding the core body with the mold die and the receiving die in the axial direction of the core body; and the cull plate may have a gate hole disposed in a contact surface in which the cull plate and the pot group are in contact with each other and a runner serving as a resin flow path configured to communicatively connect a discharge port configured to discharge the molten resin from the pot to the gate hole. In this case, the same operational effect as in the resin injection apparatus according to the eighth example above can be achieved.

Example 20

The method according to any one of the fifteenth to nineteenth examples above may further include attaching the plurality of pots to the mold die before holding the core body with the mold die and the receiving die; the plurality of pots may be attached by holding a portion of each pot with the mold die and a holding member such that the portion is located in a concave space formed between the mold die and the holding member; and the holding member may have a coefficient of thermal expansion higher than the first coefficient of thermal expansion of the pot. In this case, the same operational effect as in the resin injection apparatus according to the tenth example above can be achieved.

Example 21

In the method according to the twentieth example above, the portion of the pot may be a flange portion configured to protrude from the outer circumferential surface of the pot in a direction intersecting a lengthwise direction of the pot; and an interior shape of the concave space may correspond to an outer shape of the flange portion. In this case, the same operational effect as in the resin injection apparatus according to the eleventh example above can be achieved.

Example 22

In the method according to the twentieth or twenty-first example above, the holding member may include a plurality of holding members; and in attaching the plurality of pots to the mold die, the portion of the pot may be held by a pair of holding members and the mold die. In this case, the same operational effect as in the resin injection apparatus according to the twelfth example above can be achieved.

Example 23

The method according to any one of the twentieth to twenty-second examples above may include attaching to the mold die a positioning portion configured to suppress rotation of the pot relative to the mold die, before attaching the pots to the mold die. In this case, the same operational effect as in the resin injection apparatus according to the thirteenth example above can be achieved.

Example 24

In the method according to any one of the twentieth to twenty-third examples above, in pushing out the molten resin in each of the pots attached to the mold die toward the core body with a plunger, the mold die may be heated, and in a state in which the mold die is heated, an opposed surface to the core body of the pot may be flush with an opposed surface to the core body of the mold die or may be located closer to the receiving die than the mold die. In this case, the same operational effect as in the resin injection apparatus according to the fourteenth example above can be achieved.

Illustration of Embodiments

Exemplary embodiments according to the present disclosure will be described in detail below with reference to the drawings. In the following description, the same elements or the elements having the same function are denoted with the same reference signs and an overlapping description may be omitted.

First Embodiment

Configuration of Core Product

Figure 5:
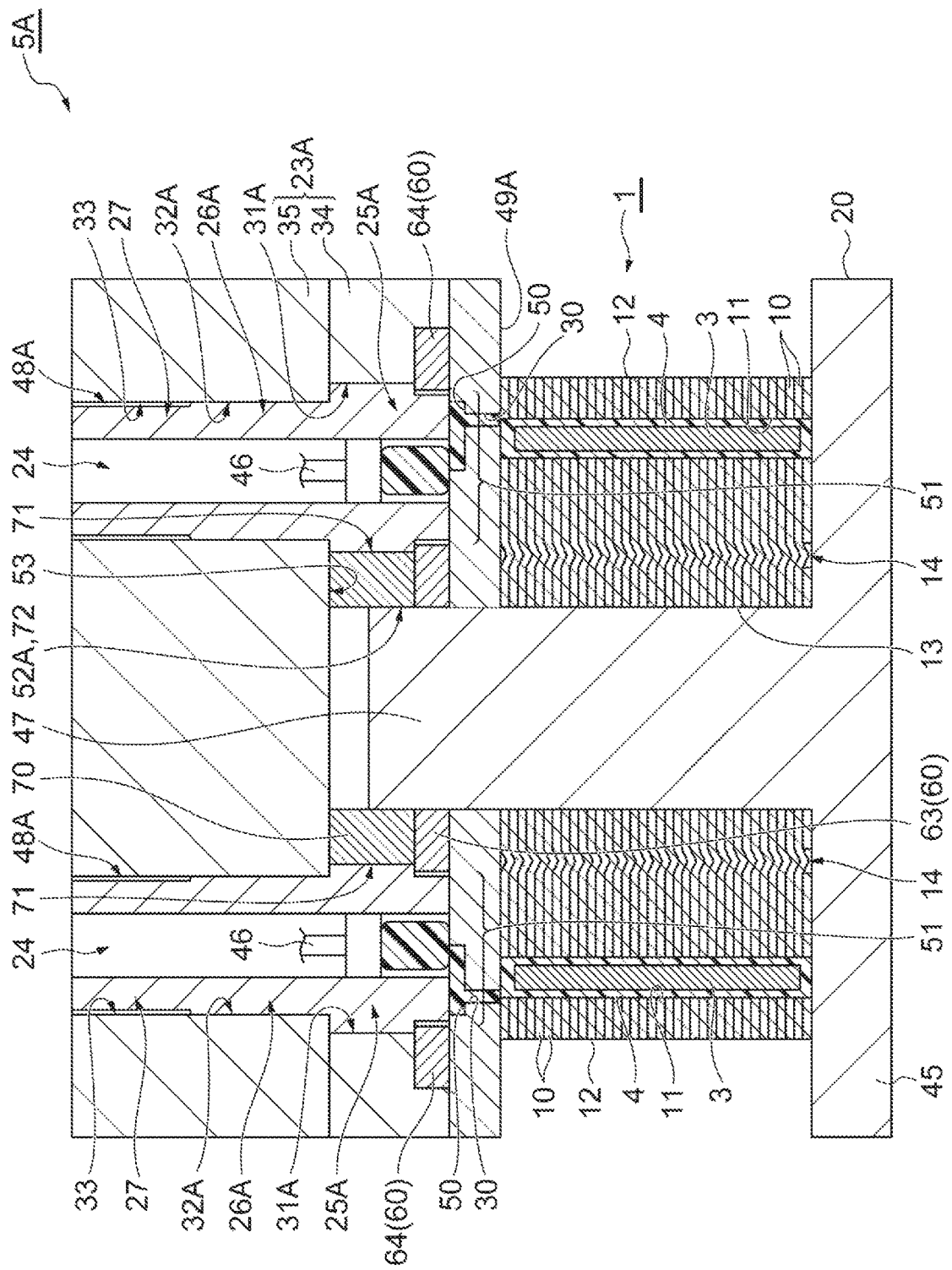
FIG. 5 is a cross-sectional view of the overall configuration of a resin injection apparatus according to a second embodiment as viewed from the side.

Referring to FIG. 1, the configuration of a stacked rotor core 1, as illustrated at FIG. 5, which is an exemplary core product will be described. The stacked rotor core 1 is a part of the rotor of a motor (electric motor). The rotor is configured such that an end plate and a shaft (both not shown) are attached to the stacked rotor core 1. The stacked rotor core 1 includes a core body 12, a permanent magnet 3, and a resin material 4 (resin) (see FIG. 5 for the permanent magnet 3 and the resin material 4).

The core body 12 has a cylindrical shape. At the central portion of the core body 12, a shaft hole 13 is formed to pass through the core body 12 so as to extend along the center axis of the core body 12. The core body 12 has an annular shape as viewed from the direction along the center axis of the core body 12 (that is, as two-dimensionally viewed). A shaft is inserted into the shaft hole 13.

The core body 12 is a stack in which a plurality of blanked members 10 are stacked along the center axis of the core body 12. The blanked member 10 is a plate-like member formed by blanking a strip-like metal plate (for example, electrical steel sheet, amorphous metal plate, etc.) into a predetermined shape. The blanked member 10 may be formed by blanking a sheet of strip-like material or may be formed by blanking multiple sheets (for example, two or three or more) of strip-like material superimposed on each other. The thickness of the blanked member 10 may be, for example, about 0.10 mm to 0.5 mm.

The blanked member 10 has a shape corresponding to the core body 12. In the present embodiment, the blanked member 10 has an annular shape. For example, the blanked member 10 may have a split structure that can be divided into a plurality of core pieces each having an arc shape or may be an integral structure that is not split.

The core body 12 may be a stack in which a plurality of blocks are stacked. Each block is formed such that a plurality of blanked members 10 are stacked. The core body 12 may be formed such that a plurality of block cores are rotationally stacked. All of a plurality of block cores may have the same shape, or some of a plurality of block cores may have a shape different from the shape of the other block cores.

The blanked members 10 arranged adjacent to each other in the stacking direction of the core body 12 (hereinafter simply referred to as "stacking direction") may be bonded (fastened) to each other, for example, through a swaged area 14 (see FIG. 5). The method of bonding the blanked members 10 to each other is not limited to bonding through the swaged area 14. For example, the blanked members 10 may be bonded to each other using an adhesive, or may be welded to each other, or may be bonded to each other using a resin material.

When the blanked members 10 are bonded to each other using a resin material, for example, a coupling hole (resin formation region) provided in the core body 12 and that passes through the core body 12 in the stacking direction may be filled with a resin material whereby the adjacent blanked members 10 in the stacking direction are bonded to each other. The resin material may be similar to the resin material 4 described later. The method of bonding the blanked members 10 to each other may be a combination of two or more of: bonding through the swaged area 14; bonding by adhesive; welding; and bonding by resin.

A plurality of magnet insertion holes 11 are formed in the core body 12. As shown in FIG. 1, a plurality of magnet insertion holes 11 are aligned at regular intervals along the outer peripheral edge of the core body 12. Each of a plurality of magnet insertion holes 11 is shaped like, for example, an elongated hole. Some of the plurality of magnet insertion holes 11 extend along the outer peripheral edge of the core body 12. Other magnet insertion holes 11 extend along the radial direction of the core body 12. The magnet insertion holes 11 extend along the stacking direction and passes through the core body 12. The number, position, and shape of the magnet insertion holes 11 may be changed according to the application of the motor, the requested performance, and the like.

At least one permanent magnet 3 is inserted in each magnet insertion hole 11. One permanent magnet 3 may be inserted in one magnet insertion hole 11. A plurality of permanent magnets 3 may be inserted in one magnet insertion hole 11. In the magnet insertion hole 11, a plurality of permanent magnets 3 may be aligned in the stacking direction, or may be aligned in the circumferential direction of the core body 12, or may be aligned in the radial direction of the core body 12. The kind of permanent magnet 3 can be determined according to the application of the motor, the requested performance, and the like. For example, the permanent magnet 3 may comprise a sintered magnet or may comprise a bonded magnet.

The resin material 4 is filled in the magnet insertion hole 11 having the permanent magnet 3 inserted therein. The resin material 4 is formed by curing molten resin. The resin material 4 has the function of fixing the permanent magnet 3 in the magnet insertion hole 11 and the function of bonding the adjacent blanked members 10 in the stacking direction (top-bottom direction) to each other. Accordingly, the magnet insertion hole 11 also serves as a region (resin formation region) where the resin material 4 is to be formed by injection of molten resin.

The resin material 4 may be any material that can be injected in the molten state into the magnet insertion hole 11. Examples of the resin material include thermosetting resins and thermoplastic resins.

Configuration of Resin Injection Apparatus

Referring now to FIG. 1 to FIG. 4, a resin injection apparatus 5 will be described. The resin injection apparatus 5 is an apparatus for injecting molten resin into the magnet insertion holes 11 of the core body 12. The resin injection apparatus 5 includes a receiving die 20, a cull plate 21, a mold die 23, a pot group 29, and a plurality of plungers 46 (see FIG. 5 for the receiving die 20 and the plungers 46).

The receiving die 20 forms a pressing mold. The receiving die 20 includes a base 45 and an insertion post 47. The base 45 is a plate-like body having an approximately rectangular shape. The core body 12 is placed on the base 45. The insertion post 47 is positioned at the approximately central portion of the base 45 and protrudes upward from the upper surface of the base 45. The insertion post 47 has a cylindrical shape and has an outer shape corresponding to the shaft hole 13. In the present embodiment, the receiving die 20 is located below and functions as a lower die. The receiving die 20 contains, for example, a heater (heating means).

The cull plate 21 can be disposed between the core body 12 and the mold die 23. In the present embodiment, the cull plate 21 is disposed on an opposed surface 49 (the surface on the molten resin discharge side) to the core body 12 in the mold die 23. The cull plate 21 is a metal plate-like member, for example, a stainless steel plate or a steel plate. The cull plate 21 has a plurality of gate holes 30 and a plurality of runners 50 (see FIG. 5).

As shown in FIG. 1, a plurality of gate holes 30 are aligned at regular intervals along the outer peripheral edge of the core body 12 to respectively correspond to a plurality of magnet insertion holes 11 of the core body 12. The gate hole 30 is disposed in a contact surface 51 of the cull plate 21 in which the pot group 29 and the cull plate 21 are in contact with each other (see FIG. 5). The runner 50 is a resin flow path that communicatively connects a discharge port for discharging molten resin from a pot 22 described later to the gate hole 30. The runner 50 extends in the contact surface 51. The runner 50 may connect one discharge port to one gate hole 30 or may connect one discharge port to a plurality of gate holes 30.

The mold die 23 forms a resin injection mold and functions as molding means together with the receiving die 20. That is, the mold die 23 holds the core body 12 together with the receiving die 20 in the stacking direction (the axial direction of the core body 12). In the present embodiment, the mold die 23 is located above the core body 12 and functions as an upper die together with the pot group 29. The mold die 23 contains, for example, a heater (heating means).

Figure 3:
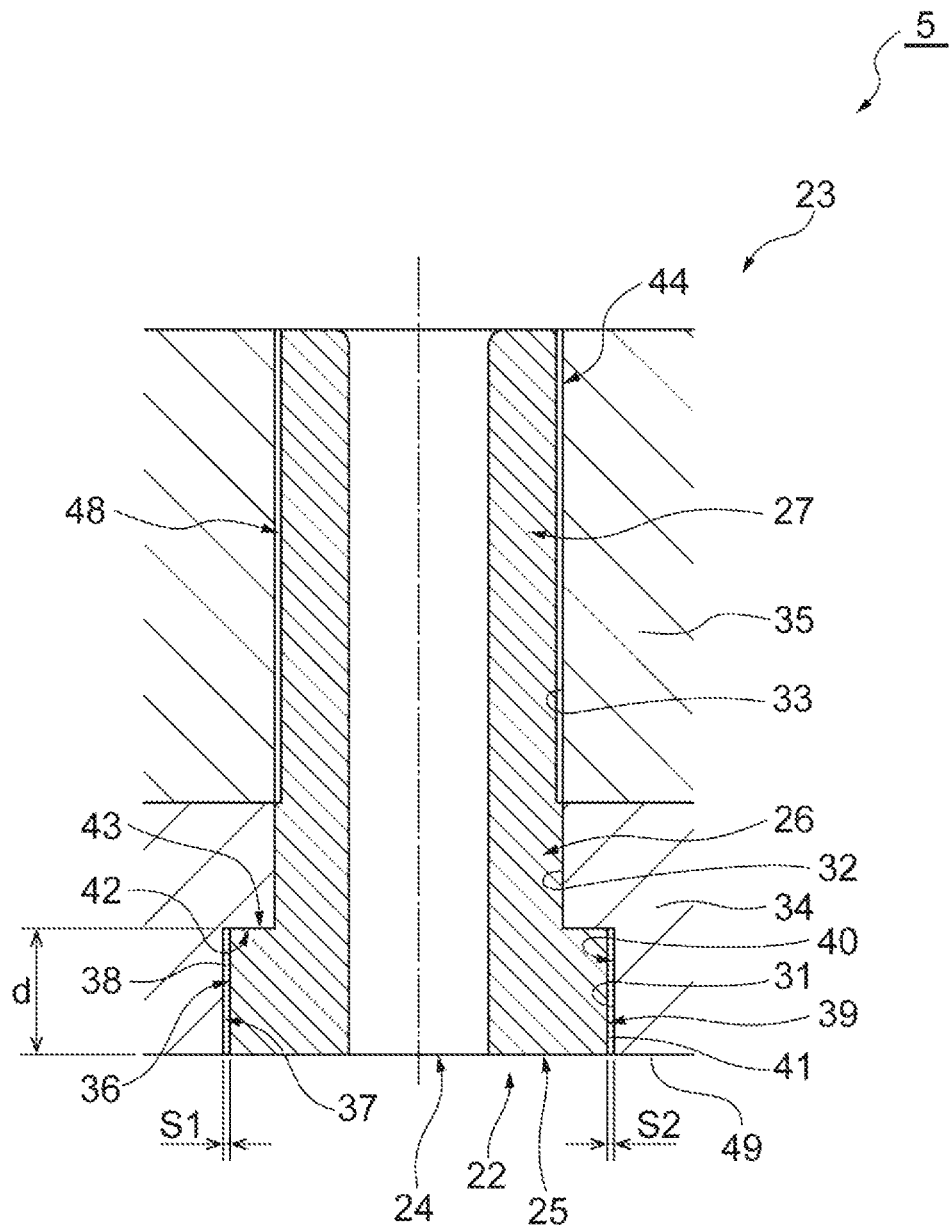
FIG. 3 is a cross-sectional view of a portion of the mold die and the pot shown in FIG. 1 as viewed from the side.
Figure 4:
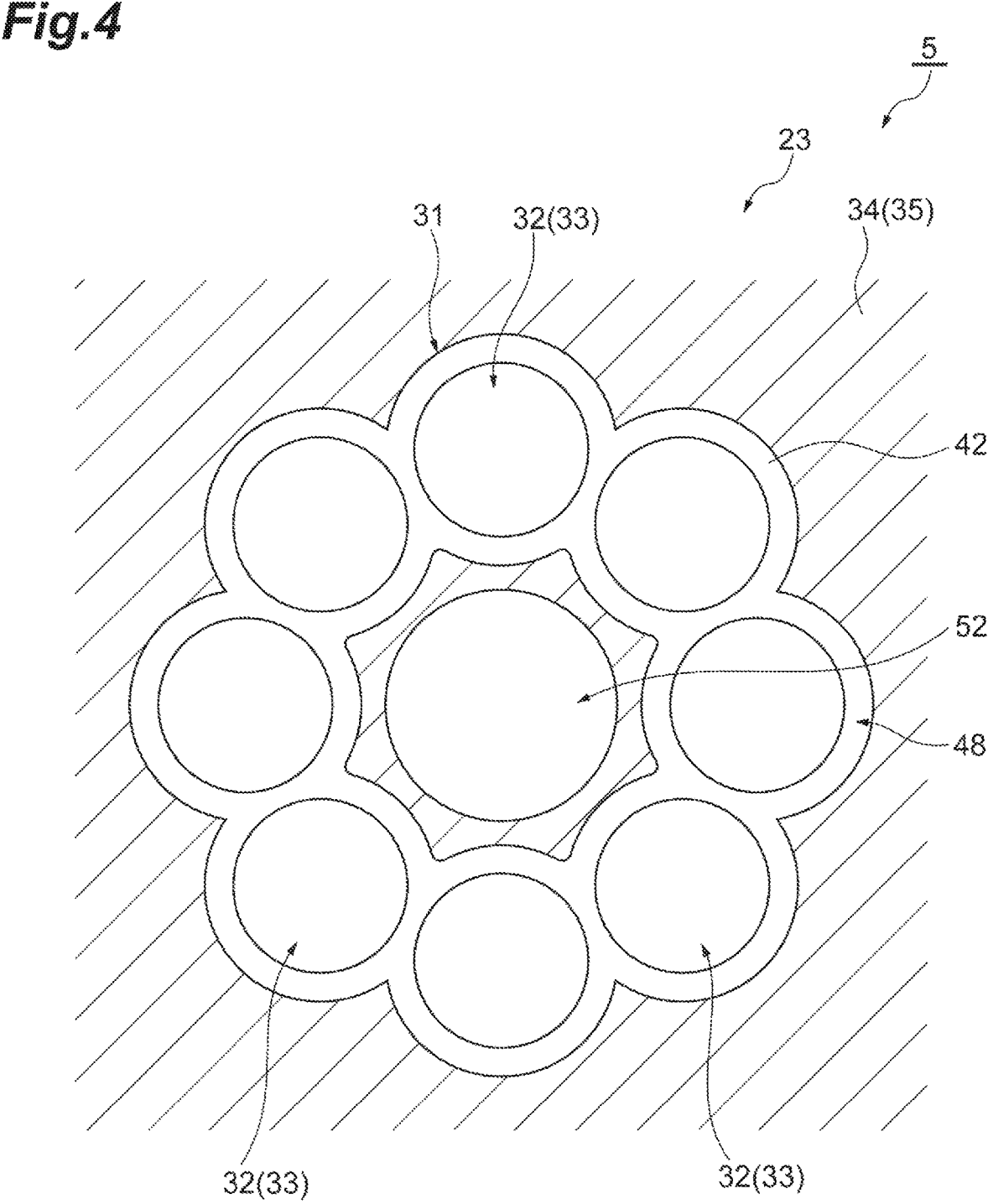
FIG. 4 is a partial bottom view of the mold die shown in FIG. 1.

The mold die 23 is made of steel (for example, ordinary steel, carbon steel, etc.). As shown in FIG. 3 and FIG. 4, the mold die 23 includes a cavity plate 34 and a mount 35. The cavity plate 34 is attached to the mount 35, for example, with a bolt (not shown). The cavity plate 34 is located closer to the core body 12 than the mount 35. The cavity plate 34 can be separated from the mount 35 in the stacking direction (top-bottom direction).

As shown in FIG. 1, FIG. 3, and FIG. 4, the mold die 23 has an accommodating depression 48 passing through the mold die 23 in the stacking direction. The accommodating depression 48 is configured to accommodate the pot group 29. The details of the accommodating depression 48 will be described later.

The pot group 29 is attached to the mold die 23. As shown in FIG. 1 and FIG. 4, the pot group 29 includes a plurality of (for example, eight) pots 22 annularly aligned. A plurality of pots 22 are aligned along the circumferential direction (predetermined direction) of the core body 12 as viewed from above in a state in which the core body 12 is installed in the resin injection apparatus 5. Adjacent pots 22 are proximately located so as to be opposed to each other. The state in which the adjacent pots 22 are closely or proximately located to each other may include a state in which the adjacent pots 22 abut against and contact each other, and may include a state in which the adjacent pots 22 do not abut against each other but are disposed with a slight distance there between, such as due to manufacturing tolerances.

The front end of the pot group 29 faces the core body 12 with the cull plate 21 interposed (see FIG. 1). As also shown in FIG. 1, the maximum outer diameter W of the pot group 29 in the opposed surface 49 to the core body 12 is set larger than the maximum outer diameter (diameter) D of the core body 12. The maximum outer diameter W may be, for example, about 1.01 times to 1.3 times as large as the maximum outer diameter D of the core body 12. The maximum outer diameter W may be set larger than the outer diameter of the cull plate 21. The area of the region of the opposed surface 49 that faces the core body 12 is, for example, 50% or more or may be 70% or more of the area of the end surface of the core body 12.

The coefficient of thermal expansion of a pot 22 is lower than the coefficient of thermal expansion of the mold die 23. The pot 22 is formed of cemented carbide. The hardness of the cemented carbide that forms the pot 22 may be, for example, a Rockwell hardness of 80 HRA or more or about 80 HRA to 100 HRA. The material of cemented carbide that forms the pot 22 may be, for example, tungsten carbide or any similar alloy.

A plurality of pots 22 have the same shape. Each pot 22 has, for example, a tubular (approximately cylindrical) shape extending along the stacking direction. Each pot 22 has a through hole 24 in which a corresponding plunger 46 of a plurality of plungers 46 can be inserted. The through hole 24 is formed to pass through in the axial direction of each pot 22. The through hole 24 is a space loaded with granular (solid) resin pellets. The resin pellets are heated to become molten resin, which is then pushed by the plunger 46 from the inside of the through hole 24 toward the core body 12 and injected into the magnet insertion hole 11 of the core body 12.

Figure 2:
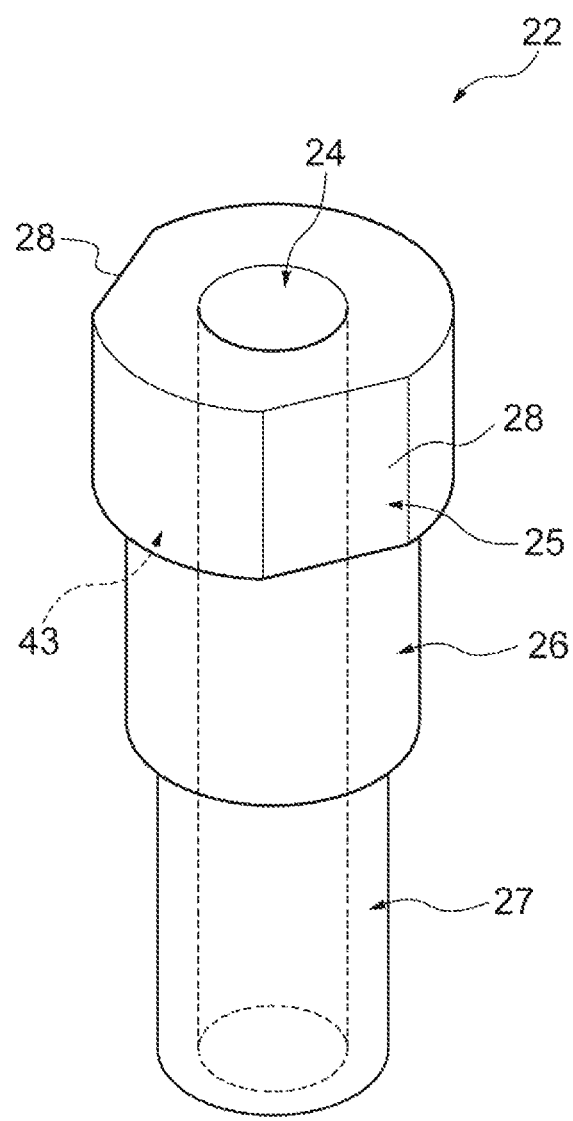
FIG. 2 is a perspective view of the pot shown in FIG. 1.

As shown in FIG. 2 and FIG. 3, the pot 22 has a front end portion 25 (resin supply portion), a fixed portion 26, and a base end portion 27 (insertion portion). The front end portion 25, the fixed portion 26, and the base end portion 27 are aligned in a row in this order and configured such that their widths are gradually reduced in this order.

The front end portion 25 is positioned on the core body 12 side in a state in which the pot group 29 is accommodated in the accommodating depression 48. Thus, the end surface of the front end portion 25 forms a part of the opposed surface 49 of the pot group 29. As shown in FIG. 1, the front end portion 25 of one pot 22 is closely located so as to be directly opposed to the front end portion 25 of another pot 22 adjacent thereto. Specifically, the front end portion 25 has a pair of opposed surfaces 28. The pair of opposed surfaces 28 are closely located so as to be opposed to the opposed surfaces 28 of adjacent other pots 22 on two sides of the front end portion 25. Although FIG. 1 shows a state in which the opposed surfaces 28 of the adjacent pots 22 abut against each other, the opposed surfaces 28 of the adjacent pots 22 may at least partially abut against each other or the opposed surfaces 28 of the adjacent pots 22 may be disposed with a slight distance there between. In the present embodiment, the opposed surface 28 is planar. That is, the front end portion 25 has a portion having an approximately arc shape and a pair of linear portions each of which forms the opposed surface 28, as viewed from the stacking direction. The angle θ formed between a pair of linear portions (a pair of flat surfaces) as viewed from the stacking direction is 360/N (°) where N is the number of pots 22 disposed annularly.

The fixed portion 26 is located between the front end portion 25 and the base end portion 27. The fixed portion 26 has a cylindrical shape having a reduced width (reduced diameter) compared with the front end portion 25. A step (surface) 43 is formed at the boundary between the front end portion 25 and the fixed portion 26 of the pot 22. The base end portion 27 has a cylindrical shape having a width that is further reduced (reduced diameter) compared with the fixed portion 26.

A plurality of plungers 46 are disposed to respectively correspond to the through holes 24 of the plurality of pots 22. That is, the number of plungers 46 is equal to the number of through holes 24. In the present embodiment, the number of plungers 46 and the number of through holes 24 are both eight. Each plunger 46 pushes out the molten resin in the through hole 24 of the corresponding pot 22 toward the core body 12. Each plunger 46 is provided to be movable up and down in the through hole 24 of the corresponding pot 22 by a drive source (for example, cylinder, jack, etc.).

The accommodating depression 48 described above will now be described in detail. As shown in FIG. 1, FIG. 2, and FIG. 4, the accommodating depression 48 has one post accommodating portion 52, a plurality of front end accommodating portions 31 (storing portions), a plurality of fixed holes 32 (positioning holes), and a plurality of base end accommodating portions 33 (insertion holes).

The post accommodating portion 52 is formed at the approximately central portion of the cavity plate 34 to pass through the cavity plate 34. The post accommodating portion 52 is configured to accommodate the insertion post 47. Thus, the post accommodating portion 52 has a circular shape as viewed from the stacking direction.

The front end accommodating portion 31, the fixed hole 32, and the base end accommodating portion 33 are connected in this order from the opposed surface 49 side to the back surface side. A plurality of pots 22 are attached to the accommodating depression 48 so as to be accommodated in the accommodating depression 48.

The front end accommodating portion 31 is formed in the cavity plate 34. Thus, the front end accommodating portion 31 is located on the opposed surface 49 side (the molten resin discharge side) of the mold die 23. A plurality of front end accommodating portions 31 are annularly arranged in a continuous manner to surround the post accommodating portion 52. The adjacent front end accommodating portions 31 are in communication with each other. Thus, a plurality of front end accommodating portions 31 as a whole constitute a single depression. Each front end accommodating portion 31 is configured to accommodate the front end portion 25 of a corresponding pot 22. Each front end accommodating portion 31 has a shape (circular shape) corresponding to the front end portion 25 of each pot 22.

In a state in which the pot 22 is attached to the accommodating depression 48, the outer circumferential surfaces 36, 39 of the front end portion 25 are spaced apart from the inner circumferential surfaces 37, 40 of the front end accommodating portion 31. Specifically, the front end accommodating portion 31 accommodates the front end portion 25 of the pot 22 with spaces 38, 41 from the front end portion 25 of the pot 22. The space 38 is a space provided between the inner circumferential surface 37 (the inner circumferential surface on the inside) located on the inside of the front end accommodating portion 31 (the post accommodating portion 52 side) and the outer circumferential surface 36 (the outer circumferential surface on the inside) of each front end portion 25 that faces the inner circumferential surface 37. The space 41 is a space provided between the inner circumferential surface 40 (the inner circumferential surface on the outside) located on the outside of the front end accommodating portion 31 (the opposite side to the post accommodating portion 52) and the outer circumferential surface 39 of each front end portion 25 (the outer circumferential surface on the outside) that faces the inner circumferential surface 40. The respective widths S1, S2 of the spaces 38, 41 may be, for example, 0.5 mm or more to 3.0 mm or less. The lower limit of each width S1, S2 may be 1.0 mm. The upper limit of each width S1, S2 may be 2.0 mm. The depth d of the spaces 38, 41 may be, for example, 5 mm or more to 20 mm or less.

The fixed hole 32 is formed in the cavity plate 34. The fixed hole 32 is located between the front end accommodating portion 31 and the base end accommodating portion 33. A plurality of fixed holes 32 are configured to be respectively fitted on the fixed portions 26 of a plurality of pots 22. The number of fixed holes 32 is equal to the number of fixed portions 26 of the pots 22. In the present embodiment, eight fixed holes 32 are provided. Each fixed hole 32 has a circular shape in cross section. As shown in FIG. 4, in a two-dimensional view, one fixed hole 32 is smaller than one front end accommodating portion 31. In this manner, a step (surface) 42 is formed at the boundary between the front end accommodating portion 31 and the fixed hole 32. This step 42 is in abutment with the step 43 of the pot 22.

In this fixed hole 32, the fixed portion 26 of the pot 22 is fixed (fitted) to the accommodating depression 48 whereby the pot 22 is attached to the accommodating depression 48. The fixed portion 26 is fixed to the fixed hole 32, for example, by shrink fit. Examples of the method for fixing the fixed portion 26 to the fixed hole 32 include shrink fit, bonding using adhesive, fixing using a retainer, or a combination of two or more of these methods.

The base end accommodating portion 33 is formed in the mount 35. The base end accommodating portion 33 is located on the back surface side (granular resin supply side) of the mold die 23 that is the opposite side to the opposed surface 49. A plurality of base end accommodating portions 33 are configured to respectively accommodate the base end portions 27 of a plurality of pots 22. That is, the number of base end accommodating portions 33 is equal to the number of base end portions 27 (pots 22). In the present embodiment, eight base end accommodating portions 33 are provided. Each base end accommodating portion 33 has a circular shape in cross section. The inner diameter of the base end accommodating portion 33 is larger than the outer diameter of the base end portion 27. For example, as shown in FIG. 3, the inner diameter of the base end accommodating portion 33 may be equal to the inner diameter of the fixed hole 32, and the outer diameter of the base end portion 27 of the pot 22 may be smaller than the outer diameter of the fixed portion 26. Alternatively, the inner diameter of the base end accommodating portion 33 may be larger than the inner diameter of the fixed hole 32, and the outer diameter of the base end portion 27 of the pot 22 may be equal to the outer diameter of the fixed portion 26. With such a configuration, when the base end portion 27 of the pot 22 is inserted into the base end accommodating portion 33, the base end portion 27 is disposed at a distance 44 from the base end accommodating portion 33. That is, the outer circumferential surface of the base end portion 27 of the pot 22 attached to the accommodating depression 48 is spaced apart from the inner circumferential surface of the accommodating depression 48.

Method of Manufacturing Stacked Rotor Core

A method of manufacturing a stacked rotor core 1 according to the first embodiment will now be described with reference to FIG. 1 and FIG. 3. First of all, a plurality of blanked members 10 each blanked from a strip-like metal plate using a die (not shown) are successively stacked to obtain a core body 12 (first step). Here, a plurality of blanked members 10 may be bonded through the swaged area 14, bonded using adhesive, welded, bonded with a resin material, or bonded by a combination of at least two or more of these methods. A plurality of blanked members 10 may not be bonded to each other at this point of time. In this case, for example, a plurality of blanked members 10 are positioned and stacked on a table to obtain a core body 12 in a single piece. Next, a permanent magnet 3 (see FIG. 5) is inserted into each magnet insertion hole 11 of the core body 12. The permanent magnet 3 may or may not be magnetized.

Next, a cull plate 21 is placed on the produced core body 12 (second step). In this state, the core body 12 and the cull plate 21 are heated to a predetermined temperature (for example, about 160° C. to 185° C.) depending on, for example, the kind of resin material 4 (third step). With this process, the flowability of molten resin flowing through the cull plate 21 and the core body 12 can be maintained, and the resin can be injected stably. The heating may not be limited to any particular method and, for example, gas (hot air) or a heater may be used. The core body 12 may be heated to a temperature (for example, about 60° C. to 100° C.) lower than the cull plate 21. In this case, the heating time for the core body 12 can be reduced, and the productivity can be improved.

Next, a resin injection apparatus 5 is prepared (fourth step). That is, a plurality of pots 22 are attached to the mold die 23. Specifically, first, the fixed portion 26 of the pot 22 is shrink-fitted in the fixed hole 32 of the cavity plate 34. Subsequently, the cavity plate 34 is attached to the mount 35. The mount 35 and the cavity plate 34 may be connected to each other, for example, through a bolt.

The resin injection apparatus 5 is to be prepared (fourth step) before the core body 12 is set in the resin injection apparatus 5. That is, the fourth step may be performed before the first step, may be performed before the second step, may be performed before the third step, may be performed after the third step, may be performed concurrently with at least one of the first to the third step, or may be performed concurrently with two or more consecutive steps of the first to third steps.

Next, the core body 12 is set in the resin injection apparatus 5 (fifth step). Specifically, first, with the insertion post 47 being inserted in the shaft hole 13, the core body 12 is placed on the base 45. Subsequently, the core body 12 is held (clamped) between the mold die 23 and the receiving die 20 in the stacking direction. Here, the mold die 23 is heated by a heater.

Next, with the core body 12 being held, the molten resin in each pot 22 of a plurality of pots 22 is pushed out toward the core body 12 by the plunger 46 (sixth step). Specifically, the resin pellets disposed in the pot 22 are heated into a molten state, and the resin in the molten state (molten resin) is pushed down by the plunger 46 and pushed out through the discharge port of the pot 22. With this step, the molten resin flows successively through the runner 50 and the gate hole 30 of the cull plate 21 to be injected into the magnet insertion hole 11. After that, when the molten resin injected into the magnet insertion hole 11 is hardened, the magnet insertion hole 11 is filled with the resin material 4. Thus, the stacked rotor core 1 is produced.

Next, the plungers 46 and the upper die (the mold die 23 and the pot group 29) are elevated, and the stacked rotor core 1 is taken out from the resin injection apparatus 5. When the pots 22 are removed from the mold die 23, the cavity plate 34 is separated from the mount 35 and thereafter the pots 22 are removed from the cavity plate 34.

Next, the cull plate 21 is removed from the stacked rotor core 1, and the unnecessary hardened material (cull) left in the gate holes 30 is removed using a rod or the like. The cull plate 21 from which cull has been removed is repeatedly used for resin injection for another core body 12. The removed cull may be, for example, discarded or recycled after crushing.

Effects

In the resin filling apparatus described in Japanese Unexamined Patent Publication No. 2015-039296, for example, when the pot is formed of a material resistant to wear or the like, the coefficient of thermal expansion of the pot may be lower than the coefficient of thermal expansion of the mold die. In such a case, when the pot and the mold die are thermally expanded by heating when molten resin is injected into the magnet insertion hole, a gap may be produced between the pot and the mold die, and the pot may be tilted relative to the mold die. When the plunger is inserted to/removed from the pot tilted relative to the mold die, for example, the pot and the plunger may undergo significant wear or the like.

However, in the present embodiment, the pot group 29 including a plurality of pots 22 aligned in a predetermined direction is attached to the mold die 23. The adjacent pots 22 which are aligned in the predetermined direction are proximately located so as to be opposed to each other. Since the coefficient of thermal expansion of a pot 22 is lower than the coefficient of thermal expansion of the mold die 23, a gap is produced between the pot 22 and the mold die 23 when the pot 22 and the mold die 23 are thermally expanded by heating during resin injection. On the other hand, even when the pot 22 and the mold die 23 are thermally expanded, the adjacent pots 22 are kept close to each other. Thus, change in posture of one pot 22 is restricted by the presence of another adjacent pot 22 in the direction of alignment. Accordingly, the tilting of the pot 22 relative to the mold die 23 can be suppressed. As a result, the wear or the like produced between the plunger 46 and the pot 22 due to insertion/removal of the plunger 46 into/from the pot 22 is suppressed, and the replacement frequency of the plunger 46 and the pot 22 is reduced. As described above, the number of times the resin injection apparatus 5 is stopped for replacement of the pot 22 or the plunger 46 is reduced, thereby improving productivity.

There are a variety of positions where the magnet insertion holes 11 may be located in the core body 12. For example, in the resin filling apparatus described in Japanese Unexamined Patent Publication No. 2015-039296, the runner that communicatively connects the discharge port for discharging molten resin from the pot to the gate hole may extend so as to span the pot and the mold die. However, if the molten resin intrudes into the gap produced between the pot and the mold die, the molten resin may push the pot to cause the pot to be tilted. Thus, in the resin filling apparatus described in Japanese Unexamined Patent Publication No. 2015-039296, there is a limit in the design so that the gate hole is disposed at a position that does not allow the molten resin to intrude into the gap.

However, with the resin injection apparatus 5 of the present embodiment, the tilting of the pot 22 relative to the mold die 23 is suppressed. Thus, even when the pot 22 is pushed by the molten resin intruding into the gap between the pot 22 and the mold die 23, the posture of the pot 22 relative to the mold die 23 is likely to be maintained. Accordingly, the structure in which the runner 50 extends so as to span the adjacent pots 22 or the structure in which the runner 50 extends so as to span the pot 22 and the mold die 23 can be employed, so that the flexibility in design of the runner 50 or the gate hole 30 can be enhanced.

In the present embodiment, the maximum outer diameter W of the pot group 29 in the opposed surface 49 to the core body 12 is set larger than the maximum outer diameter D of the core body 12. Thus, compared with a core body configuration in which the maximum outer diameter W of the pot group 29 is smaller than the maximum outer diameter D of the core body 12, the region where the core body 12 faces the pot group 29 is larger. Thus, the gate hole 30 is easily disposed in this region.

In the present embodiment, the opposed surfaces 28 of the adjacent pots 22 are planar in the circumferential direction of the core body 12. In this manner, since the opposed surface 28 is planar, the opposed surfaces 28 are more easily located close to each other so as to be directly opposed to each other. Thus, the adjacent pots 22 can be easily positioned.

In the present embodiment, the adjacent pots 22 are closely located so as to be opposed to each other at the front end portion 25 which is a portion of the pot 22 on the opposed surface 49 side to the core body 12. The mold die 23 has the accommodating depression 48 that can accommodate the pot group 29, and the outer circumferential surfaces 36, 39 of the front end portion 25 of the pot 22 attached to the accommodating depression 48 are spaced apart from the inner circumferential surfaces 37, 40 of the accommodating depression 48. Thus, even if molten resin leaks out of the runner 50 extending so as to span the pot 22 and the mold die 23, the molten resin enters the spaces 38, 41 actively formed between the outer circumferential surfaces 36, 39 of the front end portion 25 of the pot 22 and the inner circumferential surfaces 37, 40 of the accommodating depression 48. Accordingly, the leaking molten resin accumulates in these spaces 38, 41. Accordingly, the leakage of molten resin to the outside of the resin injection apparatus 5 can be suppressed.

In the present embodiment, the fixed portion 26 of the pot 22 that is located between the front end portion 25 and the base end portion 27 is fitted in the accommodating depression 48 whereby the pot 22 is attached to the accommodating depression 48. Thus, when molten resin intrudes into the spaces 38, 41 between the outer circumferential surfaces 36, 39 of the front end portion 25 of the pot 22 and the inner circumferential surfaces 37, 40 of the accommodating depression 48, the fixed portion 26 fitted in the accommodating depression 48 prevents further intrusion of the molten resin into the accommodating depression 48. Thus, the tilting of the pot 22 pushed by the molten resin intruding into the depth of the accommodating depression 48 is suppressed. Accordingly, for example, wear or the like of the pot 22 or the plunger 46 can be suppressed during insertion/removal of the plunger 46 to/from the pot 22. In addition, since the fixed portion 26 can prevent the intrusion of molten resin into the depth of the accommodating depression 48, the intruding molten resin can be easily removed. Accordingly, the ease of maintenance can be improved.

In the present embodiment, the outer circumferential surface of the base end portion 27 of the pot 22 attached to the accommodating depression 48 is spaced apart from the inner circumferential surface of the accommodating depression 48. Thus, when the pot 22 is attached to the accommodating depression 48, the base end portion 27 of the pot 22 is easily inserted into the accommodating depression 48. Accordingly, the operation of attaching the pot 22 to the mold die 23 is facilitated, thereby further improving the ease of maintenance.

In the present embodiment, the cull plate 21 is disposed between the core body 12 and the mold die 23. The cull plate 21 has the gate hole 30 disposed in the contact surface 51 where the cull plate 21 and the pot group 29 are in contact with each other and the runner 50 serving as a resin flow path that communicatively connects the discharge port for discharging molten resin from the pot 22 to the gate hole 30. Since the gate hole 30 is disposed in the contact surface 51 between the pot group 29 and the cull plate 21, the pot 22 is communicatively connected to the gate hole 30 in the contact surface 51. Thus, when molten resin flows from the pot 22 to the gate hole 30, it can be suppressed that the molten resin flows across the gap between the pot 22 and the mold die 23.

In the present embodiment, the pot 22 is formed of cemented carbide. Thus, even when the pot 22 and the plunger 46 come into contact with each other during insertion/removal of the plunger 46 into/from the pot 22, wear or the like of the pot 22 can be reduced.

Second Embodiment

Resin Injection Apparatus

Referring now to FIG. 5 to FIG. 7, FIG. 8A, and FIG. 8B, a resin injection apparatus 5A according to a second embodiment will be described. The resin injection apparatus 5A differs from the resin injection apparatus 5 in that it includes a mold die 23A instead of the mold die 23, that it includes a pot group 29A instead of the pot group 29, and that it further includes a holding member 60 and a positioning portion 70. The other configuration of the resin injection apparatus 5A is similar to the resin injection apparatus 5. In the mold die 23A, an accommodating depression 48A that can accommodate the pot group 29A is provided instead of the accommodating depression 48 of the mold die 23. The different points will mainly be described below.

Figure 6:
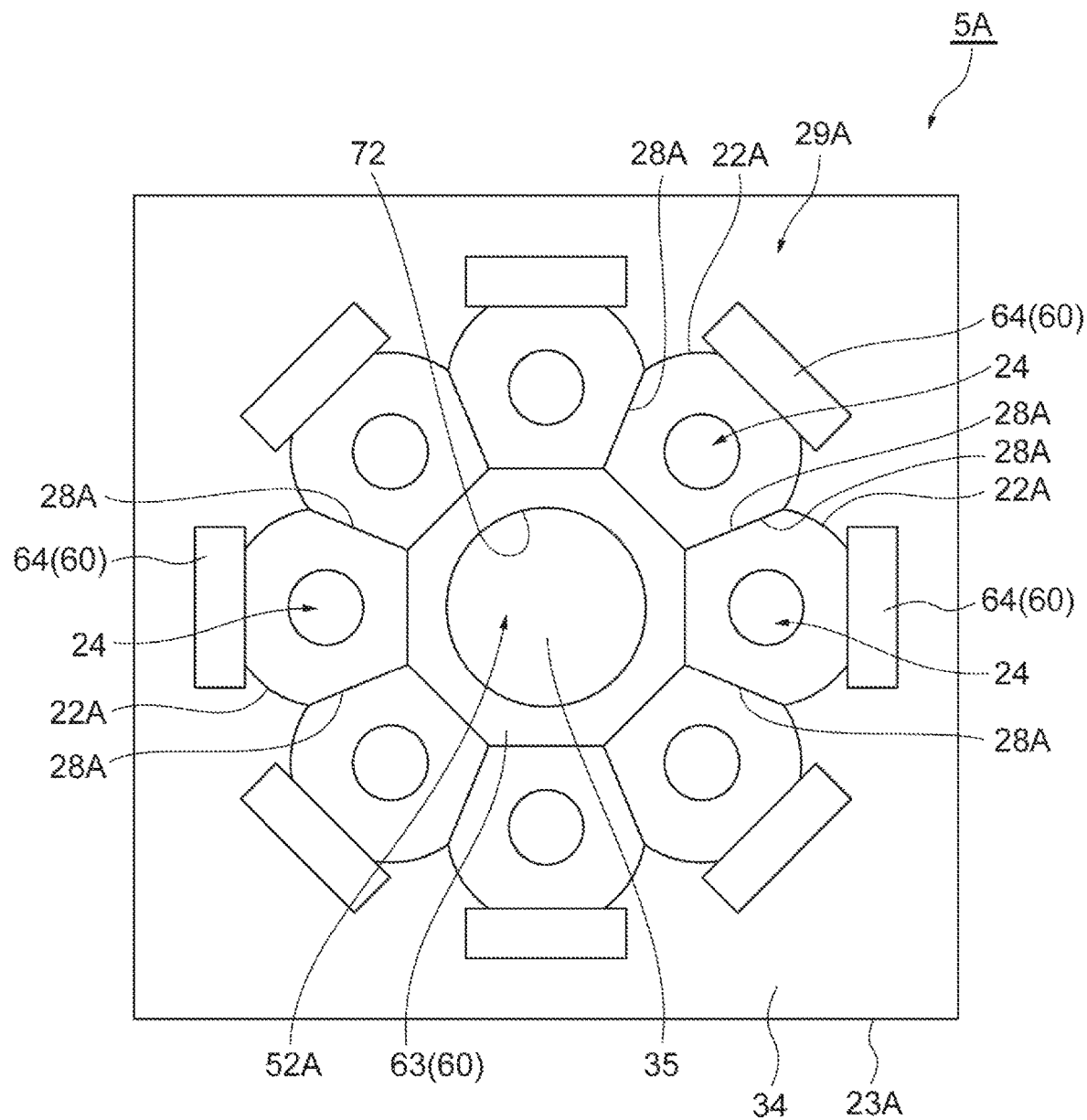
FIG. 6 is a plan view of the mold die, the pots, and the holding member shown in FIG. 5 as viewed from below.

First of all, the pot group 29A will be described in detail. As shown in FIG. 5 and FIG. 6, the pot group 29A includes a plurality of (for example, eight) pots 22A annularly aligned in the circumferential direction (predetermined direction) of the core body 12, in the same manner as in the pot group 29. A plurality of pots 22A are aligned along the circumferential direction (predetermined direction) of the core body 12 as viewed from above in a state in which the core body 12 is installed in the resin injection apparatus 5A. The adjacent pots 22A are closely located so as to be directly opposed to each other.

The pot 22A has a front end portion 25A instead of the front end portion 25 of the pot 22. The front end portion 25A is located on the core body 12 side in a state in which the pot group 29A is accommodated in the accommodating depression 48A. Thus, the end surface of the front end portion 25A forms part of the opposed surface 49A of the pot group 29A.

As shown in FIG. 6, the front end portion 25A of one pot 22A is closely or proximately located so as to be directly opposed to the front end portion 25A of another pot 22A adjacent thereto. Specifically, the front end portion 25A has a pair of opposed surfaces 28A. The pair of opposed surfaces 28A are closely located so as to be directly opposed to the opposed surfaces 28A of other pots 22 adjacent on the opposite sides of the front end portion 25A. Although FIG. 6 illustrates a state in which the opposed surfaces 28A of the adjacent pots 22A abut against each other, the opposed surfaces 28A of the adjacent pots 22A may at least partially abut against each other, or the opposed surfaces 28A of the adjacent pots 22A may be disposed with a slight distance. In the present embodiment, the opposed surface 28A is planar.

As shown in FIG. 7, the front end portion 25A has an inner wall surface 36A and an outer wall surface 39A on both sides in the radial direction of the core body 12. In the present embodiment, the inner wall surface 36A and the outer wall surface 39A are planar. The inner wall surface 36A and the outer wall surface 39A are, for example, parallel to each other.

The front end portion 25A has a body 54 and flange portions 55, 56 (portions) protruding from the outer circumferential surface (the inner wall surface 36A and the outer wall surface 39A) of the pot 22A in a direction intersecting the lengthwise direction of the pot 22A. The flange portion 55 protrudes in the form of a rectangle from part of the inner wall surface 36A of the body 54. The flange portion 56 protrudes in the form of a rectangle from part of the outer wall surface 39A of the body 54. The flange portion 55 is formed closer to the fixed portion 26 in the inner wall surface 36A. The flange portion 56 is formed closer to the fixed portion 26 in the outer wall surface 39A. The body 54 has a stepped form with the inner wall surface 36A and the outer wall surface 39A.

The accommodating depression 48A will now be described in detail. As shown in FIG. 5 and FIG. 6, the accommodating depression 48A has a plurality of front end accommodating portions 31A instead of a plurality of front end accommodating portions 31 of the accommodating depression 48 and has a plurality of fixed holes 32A instead of a plurality of fixed holes 32 of the accommodating depression 48.

The front end accommodating portions 31A are formed in the cavity plate 34. A plurality of front end accommodating portion 31A are configured to accommodate the respective front end portions 25A of a plurality of pots 22A. That is, the number of front end accommodating portions 31A is equal to the number of front end portions 25A of the pots 22A. In the present embodiment, eight front end accommodating portions 31A are provided. Each front end accommodating portion 31A has an arrangement portion 61 in which the holding member 60 is disposed on the outer wall surface 39A side of the front end portion 25A. A plurality of front end accommodating portions 31A are connected annularly in the same manner as a plurality of front end accommodating portions 31. In a state in which the front end portions 25A are accommodated in a plurality of front end accommodating portions 31A, a region surrounded by the flange portions 55 of a plurality of front end portions 25A and the mount 35 forms an arrangement region 53 in which the positioning portion 70 is disposed.

The fixed hole 32A differs from the fixed hole 32 in that it is not formed in the cavity plate 34 but formed in the mount 35. The other configuration of the fixed hole 32A is similar to the fixed hole 32.

The holding member 60 forms a concave space 62 with the mold die 23A when being attached to the mold die 23A. The interior shape of the concave space 62 corresponds to the outer shape of the flange portions 55, 56. The holding member 60 is formed to hold the flange portions 55, 56 with the mold die 23 in a state in which the flange portions 55, 56 of the pot 22A are located in the concave space 62.

The holding member 60 includes one inside holding member 63 and a plurality of (the equal number to the pots 22A, here, eight) outside holding members 64. The inside holding member 63 has an annular shape and holds the flange portion 55 with the mold die 23 on the inner wall surface 36A side of the front end portion 25A. A plurality of outside holding members 64 are each shaped like a flat plate and hold the flange portion 56 with the mold die 23 on the outer wall surface 39A side of the front end portion 25A. With this configuration, the pot 22A is held by a pair of holding members 60 (the inside holding member 63 and the outside holding member 64) and the mold die 23A.

The positioning portion 70 is disposed in the arrangement region 53 in the accommodating depression 48A of the mold die 23A. The positioning portion 70 is configured to suppress rotation of the pot 22A relative to the mold die 23A. The positioning portion 70 has a plurality of planar abutment surfaces 71 in abutment with the flange portions 55 of a plurality of pots 22A. The number of abutment surfaces 71 is equal to the number of flange portions 55 of the pots 22A. In the present embodiment, eight abutment surfaces 71 are provided. The front end accommodating portion 31A described above is configured with a space surrounded by the abutment surface 71, the side surface of the inside holding member 63, the opposed surface to the flange portion 56 in the mold die 23 (specifically, the cavity plate 34), and the side surface of the outside holding member 64. In a state in which the pot 22A is attached to the accommodating depression 48A, the inner wall surface 36A is spaced apart from the side surface of the inside holding member 63, and the outer wall surface 39A is spaced apart from the side surface of the outside holding member 64. In other words, the outer surface of the front end portion 25A is spaced apart from the inner surface of the front end accommodating portion 31A.

The positioning portion 70 has a polygonal shape (here, an octagonal shape) corresponding to the number of abutment surfaces 71 as viewed from the stacking direction. At the center of the positioning portion 70, an insertion hole 72 is provided in which the insertion post 47 can be inserted. The insertion hole 72 passes through the positioning portion 70 in the axial direction of the positioning portion 70. In a state in which the positioning portion 70 is accommodated in the accommodating depression 48A, and each pot 22A is attached with the holding member 60 (the inside holding member 63 and the outside holding members 64), a region surrounded by a plurality of abutment surfaces 71, the outside holding members 64, and the mount 35 forms a post accommodating portion 52A that accommodates the insertion post 47.

In the present embodiment, the coefficient of thermal expansion of the mold die 23A, the holding member 60 (the inside holding member 63 and the outside holding member 64), and the positioning portion 70 is higher than the coefficient of thermal expansion of the pot 22A. The mold die 23A, the holding member 60 (the inside holding member 63 and the outside holding member 64), and the positioning portion 70 may be formed of the same material (for example, steel). By contrast, the pot 22A is formed of cemented carbide in the same manner as the pot 22.

Method of Manufacturing Stacked Rotor Core

A method of manufacturing a stacked rotor core 1 according to the second embodiment will now be described. The method of manufacturing a stacked rotor core 1 according to the second embodiment differs from the method of manufacturing a stacked rotor core 1 according to the first embodiment in that it includes preparing the resin injection apparatus 5A (fourth step) instead of preparing the resin injection apparatus 5. The different points will mainly be described below.

In the fourth step, a plurality of pots 22A are attached to the mold die 23A. Specifically, first of all, the positioning portion 70 is attached to the mount 35 of the mold die 23, for example, with a bolt. Subsequently, while the flange portion 55 of the pot 22A is positioned in abutment with each abutment surface 71 of the positioning portion 70, the fixed portion 26A of the pot 22A is shrink-fitted in the fixed hole 32A of the mount 35. Subsequently, the cavity plate 34 is attached to the mount 35, for example, with a bolt. After that, the holding member 60 is attached to the cavity plate 34 of the mold die 23A and the positioning portion 70, for example, with a bolt. The bolt for attaching the holding member 60 may pass through the cavity plate 34 and the positioning portion 70 to be inserted into the mount 35.

In a state in which a plurality of pots 22A are attached to the mold die 23A, the opposed surface 57 to the core body 12 of the pot 22A is located closer to the receiving die 20 than the opposed surface 49A to the core body 12 of the mold die 23A and the opposed surface 65 to the core body 12 of the holding member 60 (the inside holding member 63 and the outside holding member 64).

Figure 8A:
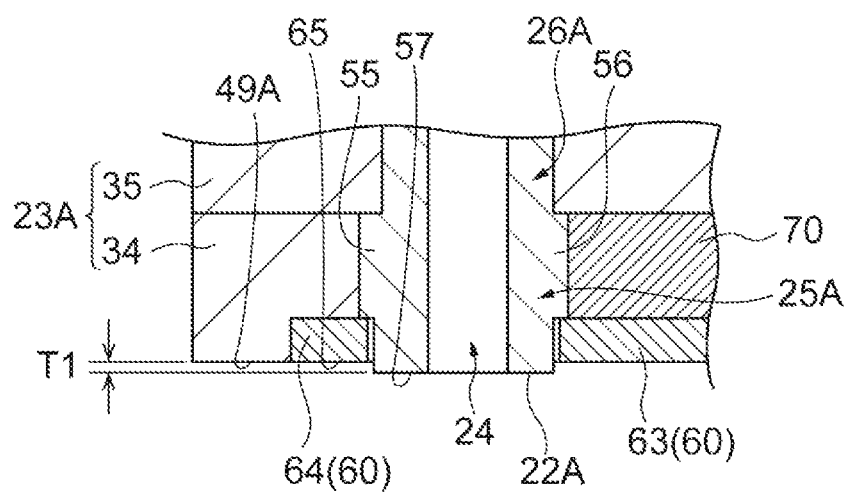
FIG. 8A and FIG. 8B are cross-sectional views as viewed from the side for explaining thermal expansion of the mold die, the pot, and the holding member.

FIG. 8A illustrates a state in which the mold die 23A, the pot 22A, and the holding member 60 are not thermally expanded. As shown in FIG. 8A, in a state in which the mold die 23A, the pot 22A, and the holding member 60 are not thermally expanded, the opposed surface 57 to the core body 12 of the pot 22A is located closer to the receiving die 20 than the opposed surface 49A to the core body 12 of the mold die 23A and the opposed surface 65 to the core body 12 of the holding member 60 (the inside holding member 63 and the outside holding member 64). The difference T1 between the opposed surface 57 and the opposed surfaces 49A, 65 may be, for example, 0.01 mm or more to 0.1 mm or less or may be 0.02 mm or more to 0.04 mm or less.

Next, the core body 12 is set in the resin injection apparatus 5A (fifth step) in the same manner as in the first embodiment. Here, the mold die 23A is heated by a heater.

Figure 8B:
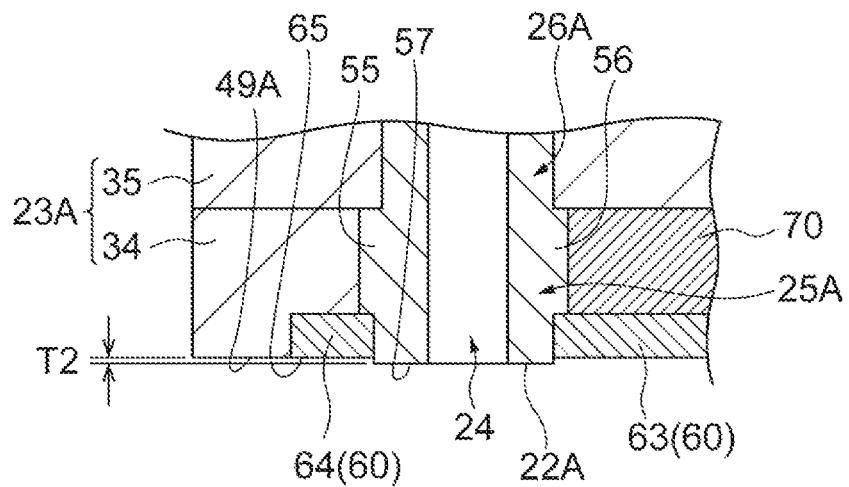

FIG. 8B illustrates a state in which the mold die 23A, the pot 22A, and the holding member 60 are thermally expanded. As shown in FIG. 8B, also in the state in which the mold die 23A, the pot 22A, and the holding member 60 are thermally expanded, the opposed surface 57 is located closer to the receiving die 20 than the opposed surfaces 49A, 65. The difference T2 between the opposed surface 57 and the opposed surfaces 49A, 65 is smaller than the difference T1. In the state in which the mold die 23A, the pot 22A, and the holding member 60 are thermally expanded, the opposed surface 57 may be flush with the opposed surfaces 49A, 65. That is, the difference T2 may be zero.

After that, the steps are performed in the same manner as in the first embodiment and the method of manufacturing a stacked rotor core 1 is finished.

Effects

The present embodiment also achieves the same operational effects as in the first embodiment.

In the present embodiment, in a state in which a portion of the pot 22A is located in the concave space formed between the mold die 23A and the holding member 60, the portion of the pot 22A is held by the mold die 23A and the holding member 60. The coefficient of thermal expansion of the holding member 60 is higher than the coefficient of thermal expansion of the pot 22A. In the present embodiment, the mold die 23A and the holding member 60 are expanded more easily due to thermal expansion than the pot 22A. Thus, supposing that a protrusion of the mold die 23 or the holding member 60 is inserted in the depression formed in the pot 22A, the protrusion may expand in the depression to exert stress on the pot 22A, or the protrusion may be disengaged from the depression due to expansion of the mold die 23A. However, in the resin injection apparatus 5A, a gap is likely to be produced between the pot 22A and the mold die 23A in the concave space 62. Thus, stress is less likely to act on the pot 22A from the mold die 23A, and the load on the pot 22A can be reduced.

In the present embodiment, a portion of the pot 22A is the flange portions 55, 56 protruding from the outer circumferential surface of the pot 22A in the direction intersecting the lengthwise direction of the pot 22A, and the interior shape of the concave space 62 corresponds to the outer shape of the flange portions 55, 56. Thus, it is possible to easily implement a configuration in which a portion of the pot 22A is held by the holding member 60 and the mold die 23A in a state in which the portion of the pot 22A is located in the concave space 62 formed with the holding member 60 and the mold die 23A.

In the present embodiment, the pot 22A is held by a pair of holding members 60 (the inside holding member 63 and the outside holding member 64) and the mold die 23A. Thus, since the flange portions 55, 56 of the pot 22A are stably held by a pair of holding members 60 and the mold die 23A, the displacement of the pot 22A from the mold die 23A can be sufficiently suppressed while the load on the pot 22A is reduced.

In the present embodiment, in the mold die 23A, the pot 22A is disposed along the positioning portion 70 configured to suppress rotation of the pot 22A relative to the mold die 23A. Thus, the orientation of each pot 22A is uniquely determined in accordance with the positioning portion 70. Accordingly, when the pots 22A are disposed, the interference between the adjacent pots 22A is suppressed. As a result, the operation of attaching the pots 22A can be easily performed.

In the present embodiment, in a state in which the mold die 23A is heated to discharge molten resin from the pot 22A, the opposed surface 57 to the core body 12 of the pot 22A is flush with the opposed surface 49A to the core body 12 of the mold die 23A or is located closer to the receiving die 20 than the mold die 23A. Thus, even in a state in which the pot 22A and the mold die 23A are expanded by heating, the structure suppressing such a state that molten resin flows across the gap can be maintained when molten resin flows from the pot 22A to the gate hole 30.

Other Embodiments

Although embodiments have been described above, the present invention is not necessarily limited to the foregoing embodiments and is susceptible to various modifications without departing from the spirit of the invention.

For example, the present invention may be applied not only to the stacked rotor core 1 but also to a stacked stator core.

The stacked stator core has a core body having a plurality of slots (magnetic pole parts) formed in the circumferential direction. The core body is a stack in which a plurality of blanked members are stacked. The blanked member has, for example, an annular shape corresponding to the core body. The blanked member may be, for example, a split structure that can be divided into a plurality of core pieces each shaped like an arc, or may be an integral structure that is not split, or may be a structure in which core pieces are at least partially connected to each other in series through a coupling portion and the coupling portion may be bent to form an annular shape.

The core body 12 may have at least one coupling hole (resin formation region) passing through in the stacking direction, so that the resin injection apparatus 5, 5A injects molten resin into the coupling hole to couple the adjacent blanked members 10 in the stacking direction to each other. For example, at least one coupling hole may include a plurality of coupling holes aligned in the circumferential direction of the core body 12.

The resin formation region is not limited to a hole (the magnet insertion hole 11, the coupling hole, etc.). For example, the resin formation region may be the surface of a slot of the stacked stator core. In this case, for example, a core may be inserted into the slot, and the resin injection apparatus 5, 5A may inject molten resin into the space produced between the surface of the slot and the outer circumferential surface of the core whereby the resin material 4 is formed in the surface of the slot.

In the foregoing embodiments, the core body 12 is configured such that a plurality of blanked members 10 are stacked. Alternatively, the core body 12 may have a configuration other than a stack. For example, the core body 12 may be formed by compression-molding ferromagnetic powder or may be formed by injection-molding a resin material containing ferromagnetic powder.

In the foregoing embodiments, molten resin is injected into the resin formation region from the mold die 23, 23A and the pots 22, 22A serving as an upper die (molten resin is injected from above the core body 12). In this case, the holding member 60 can prevent the pot 22, 22A from dropping. Alternatively, molten resin may be injected from below the core body 12 using the mold die 23, 23A and the pots 22, 22A as a lower die. Here, a portion of the pot 22, 22A may be held by at least one holding member 60 and the mold die 23, 23A.

In the foregoing embodiments, the pot group 29, 29A is configured such that a plurality of pots 22, 22A are annularly aligned. Alternatively, a plurality of pots 22, 22A may not be annularly aligned. The pot group 29, 29A may be configured, for example, with a plurality of pots 22, 22A aligned linearly in a row.

The maximum outer diameter W of the pot group 29, 29A in the opposed surface 49, 49A to the core body 12 may be smaller than the maximum outer diameter D of the core body 12.

Figure 9A:
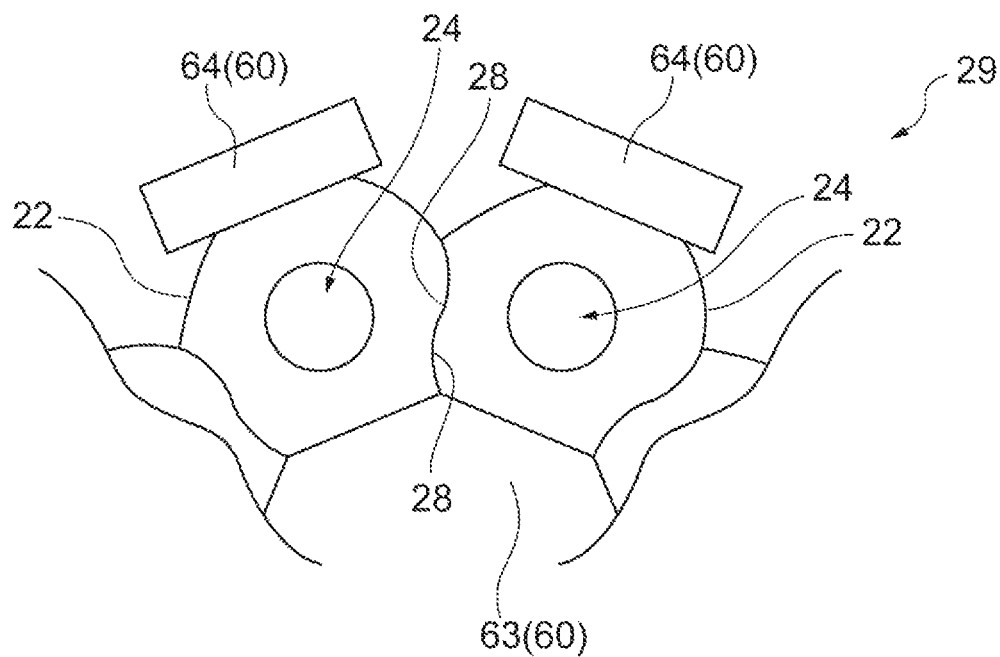
FIG. 9A and FIG. 9B are plan views of a modification of the pot as viewed from below.
Figure 9B:
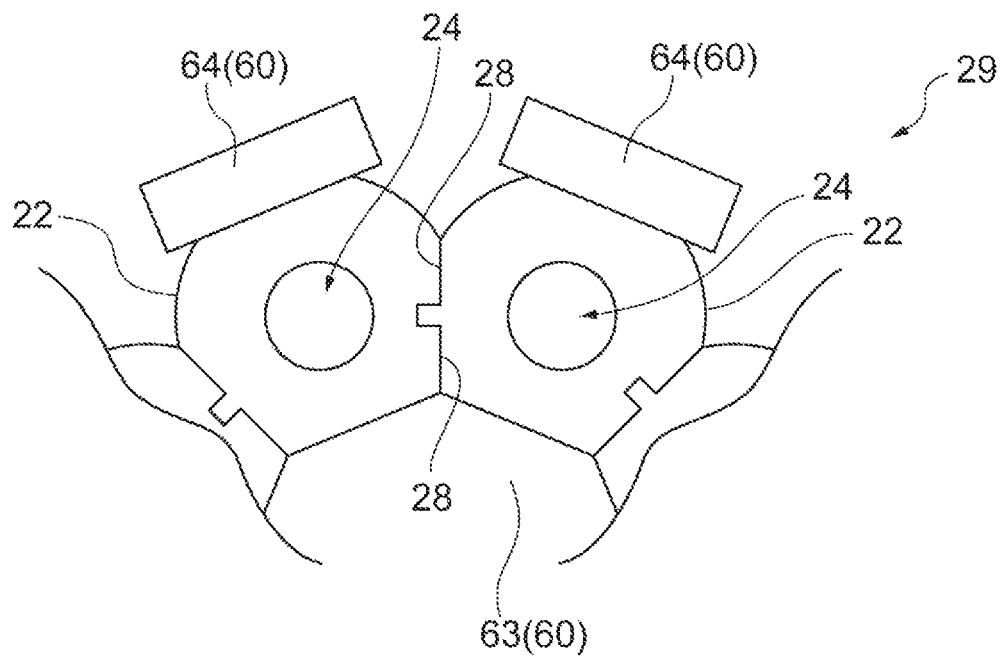

For example, as shown in FIG. 9A and FIG. 9B, the opposed surfaces 28 of the adjacent pots 22 may not be planar. In the example shown in FIG. 9A, the opposed surfaces 28 of the adjacent pots 22 are curved. In the example shown in FIG. 9B, the opposed surfaces 28 of the adjacent pots 22 are protruding and depressed surfaces. Specifically, the opposed surface 28 of one of the adjacent pots 22 has a protrusion protruding outward and the opposed surface 28 of the other has a depression depressed inward. Thus, the pots 22 are positioned by the opposed surfaces 28 which are curved surfaces or protruding and depressed surfaces. Accordingly, the positioning accuracy can be improved.

The adjacent pots 22 or the adjacent pots 22A may be proximately located so as to be opposed to each other at a portion other than the front end portion 25, 25A. The fixed portion 26, 26A of the pot 22, 22A that is fitted in the accommodating depression 48, 48A may not be located between the front end portion 25, 25A and the base end portion 27. The base end portion 27 may have a diameter equal to the diameter of the fixed portion 26, 26A. The outer circumferential surfaces 36, 39 of the front end portion 25 may not be spaced apart from the inner circumferential surfaces 37, 40 of the front end accommodating portion 31, or the outer surface of the front end portion 25A (the inner wall surface 36A and the outer wall surface 39A) may not be spaced apart from the inner surface of the front end accommodating portion 31A (the side surface of the inside holding member 63 and the side surface of the outside holding member 64). The base end portion 27 may be disposed without a distance 44 from the base end accommodating portion 33. The inner circumferential surface of the accommodating depression 48, 48A may not be spaced apart from the outer circumferential surface of the pot 22, 22A, or the inner circumferential surface of the accommodating depression 48 may not be spaced apart from the outer circumferential surface of the pot 22, 22A. As long as at least a portion of the pot group 29, 29A is accommodated in the accommodating depression 48, 48A, for example, the front end portion 25, 25A may not be accommodated or the base end portion 27 may not be accommodated. The shape of each pot 22, 22A and the shape of the accommodating depression 48, 48A are susceptible to various modifications.

When molten resin is injected into the magnet insertion hole 11, molten resin may be directly injected from the mold die 23, 23A to the magnet insertion hole 11 without using the cull plate 21. In this case, the runner 50 and the gate hole 30 may be formed in the pot 22, 22A.

The pot 22, 22A may be formed of a material other than cemented carbide.

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

What is claimed is:

1. A method of manufacturing a core product comprising:
   holding a core body with a mold die and a receiving die in an axial direction of the core body, the core body having a resin formation region that houses injected molten resin;
   pushing out the molten resin in each of a plurality of pots attached to the mold die toward the core body with a plunger, while the core body is held by the mold die and the receiving die, wherein the plurality of pots are arranged adjacent to each other in a direction of alignment to form a pot group, wherein at least some of the plurality of pots are in contact with each other, and wherein the plurality of pots have a first coefficient of thermal expansion lower than a second coefficient of thermal expansion of the mold die; and
   curing the molten resin pushed out by the plunger and injected into the resin formation region.

2. The method according to claim 1, wherein the plurality of pots are annularly aligned with each other in the direction of alignment.

3. The method according to claim 2, wherein a diameter of the pot group corresponding to an outer surface of the plurality of pots opposed to the core body is larger than a maximum outer diameter of the core body.

4. The method according to claim 1,
   wherein adjacent pots are directly opposed to each other at a front end portion of the plurality of pots opposite to the core body,
   wherein the mold die has an accommodating depression configured to accommodate the pot group, and
   wherein an outer circumferential surface of the front end portion attached to the accommodating depression is spaced apart from an inner circumferential surface of the accommodating depression.

5. The method according to claim 1 further comprising:
   attaching the plurality of pots to the mold die before holding the core body with the mold die and the receiving die,
   wherein the plurality of pots are attached by holding a portion of each pot with the mold die and a holding member such that the portion is located in a concave space formed between the mold die and the holding member, and
   wherein the holding member has a coefficient of thermal expansion higher than the first coefficient of thermal expansion of the plurality of pots.

6. The method according to claim 1,
   wherein each pot comprises a front end portion, and
   wherein at least some of the plurality of pots are in contact with each other at the front end portion.

7. The method according to claim 6,
   wherein each front end portion comprises a first planar surface and a second planar surface, and
   wherein the first planar surface associated with one pot of the plurality of pots is in contact with the second planar surface associated with an adjacent pot.

8. The method according to claim 7,
   wherein an angle formed by a virtually extended plane of the first planar surface associated with the one pot and a virtually extended plane of the second planar surface associated with the one pot is 360/N degrees, and wherein N is a number of the plurality of pots.

9. The method according to claim 7, wherein each front end portion comprises at least one arc shape portion.

10. The method according to claim 1,
    wherein each pot comprises a front end portion, a fixed portion and a base end portion,
    wherein the front end portion, the fixed portion and the base end portion are aligned in a row, and
    wherein a diameter of the front end portion, a diameter of the fixed portion and a diameter of the base end portion are different from each other.

11. The method according to claim 1,
    wherein the mold die comprises an accommodating depression configured to accommodate the pot group formed by the plurality of pots,
    wherein the accommodating depression comprises a plurality of front end accommodating portions which are annularly arranged in a continuous manner and are in communication with each other so as to form the accommodating depression as a single depression as a whole, and
    wherein each front end accommodating portion is configured to accommodate a corresponding pot of the pot group.

12. The method according to claim 11, wherein each of the front end accommodating portions has a shape corresponding to a front end portion of the corresponding pot.

13. The method according to claim 11,
    wherein the accommodating depression comprises a plurality of fixing holes,
    wherein each of the fixing holes is configured to be in contact with a corresponding fixed portion of each pot so as to fix a plurality of fixed portions of the pot group, and
    wherein a number of the fixing holes is equal to a number of the fixed portions.

14. The method according to claim 13, wherein the fixing hole and the fixed portion both have a circular shape in cross section.

15. The method according to claim 1 further comprising:
    disposing a cull plate between the core body and the mold die before holding the core body with the mold die and the receiving die in the axial direction of the core body,
    wherein the cull plate comprises:

a gate hole disposed in a contact surface in which the cull plate and the pot group are in contact with each other; and a resin flow path configured to communicatively connect a discharge port to the gate hole in order to discharge the molten resin from the pot group.

16. The method according to claim 5, wherein each pot comprises an outer circumferential surface oriented in a lengthwise direction and a flange portion that protrudes from the outer circumferential surface in a direction intersecting the lengthwise direction, and wherein an outer shape of the flange portion corresponds to an interior shape of the concave space.

17. The method according to claim 5, wherein attaching the plurality of pots to the mold die comprises holding a partial portion of each pot by a pair of holding members and the mold die.

18. The method according to claim 5 further comprising:

attaching a positioning portion to the mold die before attaching the plurality of pots to the mold die, wherein the positioning portion is configured to suppress rotation of the plurality of pots relative to the mold die.

19. The method according to claim 1, wherein the mold die is heated when the molten resin is pushed toward the core body with the plunger, and wherein a surface of each pot that is opposed to the core body is located closer to the receiving die than a surface of the mold die that is opposed to the core body, in a state in which the mold die is heated.

20. A method of manufacturing a core product comprising:

holding a core body with a mold die and a receiving die in an axial direction of the core body, the core body having a resin formation region that houses injected molten resin;

pushing out the molten resin in each of a plurality of pots attached to the mold die toward the core body with a plunger, while the core body is held by the mold die and the receiving die, wherein the plurality of pots are annularly arranged adjacent to each other in a direction of alignment to firm a pot group, wherein a diameter of the pot group corresponding to an outer surface of the plurality of pots opposed to the core body is larger than a maximum outer diameter of the core body, and wherein the plurality of pots have a first coefficient of thermal expansion lower than a second coefficient of thermal expansion of the mold die; and curing the molten resin pushed out by the plunger and injected into the resin formation region.

* * * * *